(12) United States Patent
Yang et al.

(10) Patent No.: US 10,514,891 B1
(45) Date of Patent: Dec. 24, 2019

(54) MULTI-INPUT FLOATING-POINT ADDER

(71) Applicant: Google LLC, Mountain View, CA (US)

(72) Inventors: Hsin-Jung Yang, Sunnyvale, CA (US); Andrew Everett Phelps, Middleton, WI (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/435,075

(22) Filed: Jun. 7, 2019

Related U.S. Application Data

(60) Provisional application No. 62/852,796, filed on May 24, 2019.

(51) Int. Cl.
  G06F 7/485    (2006.01)
  G06F 7/499    (2006.01)
  G06F 9/30     (2018.01)

(52) U.S. Cl.
  CPC .......... *G06F 7/49915* (2013.01); *G06F 7/485* (2013.01); *G06F 7/49952* (2013.01); *G06F 9/3001* (2013.01)

(58) Field of Classification Search
  CPC .. G06F 7/485; G06F 7/49915; G06F 7/49947; G06F 7/49952
  See application file for complete search history.

(56) References Cited

U.S. PATENT DOCUMENTS

| | | | |
|---|---|---|---|
| 8,185,570 B2 | 5/2012 | Fukumura et al. | |
| 8,650,231 B1 * | 2/2014 | Langhammer | G06F 7/483 708/204 |
| 2015/0067010 A1 * | 3/2015 | Czajkowski | G06F 17/10 708/209 |

FOREIGN PATENT DOCUMENTS

EP  0831396 A3  3/2000

OTHER PUBLICATIONS

Hollasch, "IEE Standard 754 Floating Point Numbers" IEEE, 2019, 9 pages.
Anandakumar et al, "Design and Optimized Implementation of Six-Operand Single-Precision Floating-Point Addition" ICBMG, 2011, 5 pages.
Bahoji et al, "FFT Implementation Using Floating Point Fused Multiplier with Four Term Adder" IEEE, 2017, 6 pages.
Tao et al, "Three-Operand Floating-Point Adder" IEEE, 2012, 5 pages.
Tenea, "Multi-operand Floating-point Addition" IEEE, 2009, 8 pages.

* cited by examiner

*Primary Examiner* — Chuong D Ngo
(74) *Attorney, Agent, or Firm* — Fish & Richardson P.C.

(57) ABSTRACT

Methods, systems, and apparatus, including an apparatus for adding three or more floating-point numbers. In one aspect, a method includes receiving, for each of three or more operands, a set of bits that include a floating-point representation of the operand. A given operand is identified. For each other operand, the mantissa bits of the operand are shifted such that the bits of the operand align with the bits of the given operand. A sticky bit for each other operand is determined. An overall sticky bit value is determined based on each sticky bit. The overall sticky bit value is zero whenever all of the sticky bits are zero or at least two sticky bits are non-zero and do not match. The overall sticky bit value matches the value of each non-zero sticky bit whenever all of the non-zero sticky bits match or there is only one non-zero sticky bit.

20 Claims, 3 Drawing Sheets

MULTI-INPUT FLOATING-POINT ADDER

CROSS-REFERENCE TO RELATED APPLICATIONS

This application claims the benefit under 35 U.S.C. § 119(e) of U.S. Patent Application No. 62/852,796, entitled "MULTI-INPUT FLOATING-POINT ADDER," filed May 24, 2019. The disclosure of the foregoing application is incorporated herein by reference in its entirety for all purposes.

BACKGROUND

Numbers are often represented in computers using a floating-point format. Two-input adders are often used to perform addition and subtraction (using the complement of one of the numbers) operations on floating-point numbers. To perform such operations on more than two floating-point numbers, multiple adders can be used to add up to two floating-point numbers at a time or multiple addition operations can be performed by a single adder. For example, to add three floating-point numbers, an adder can add two of the floating-point numbers and then add the third floating-point number to the sum of the first two numbers.

Floating-point addition can involve multiple steps including shifting bits to align the numbers based on their exponents, performing the addition, normalizing the sum, and rounding the sum if appropriate. Thus, performing more than one addition operation to add more than two floating-point numbers can result in multiple iterations of these steps. If multiple adders are used to compute the sums in parallel, the additional adders can take up more of the limited space of a chip that includes the adders.

SUMMARY

This specification describes technologies relating to multi-input adders that add three or more floating-point numbers.

In general, one innovative aspect of the subject matter described in this specification can be embodied in methods that include receiving, for each of three or more operands to be added by the multi-input hardware adder, a set of bits that include a floating-point representation of the operand; identifying a given operand to which each other operand will be aligned; for each other operand, generating a shifted set of bits for the operand by shifting mantissa bits of the operand zero or more bit positions such that the bits of the operand align with the bits of the given operand; determining, based on the shifting, a value of a sticky bit for each other operand, wherein the sticky bit for an operand: has a non-zero value when a non-zero value was shifted from the set of bits representing the operand to generate the shifted set of bits for the operand; and has a sign that matches a sign of the operand; determining, based on the value of each sticky bit, an overall sticky bit value, wherein: the overall sticky bit value is zero whenever (i) all of the sticky bits for all of the other operands are zero or (ii) at least two of the other operands have sticky bits that are non-zero and do not match; and the overall sticky bit value matches the value of each non-zero sticky bit whenever all of the non-zero sticky bits match or there is only one non-zero sticky bit; and determining a sum of the three or more operands using (i) the set of bits that represent the given operand, (ii) the shifted set of bits for each other operand, and (iii) the overall sticky bit value. Other implementations of this and other aspects include corresponding systems and apparatus, configured to perform the actions of the methods.

These and other implementations can each optionally include one or more of the following features. In some aspects, determining the sum of the three or more operands includes determining a summation set of bits that represents a sum of the set of bits that represent the given operand and each shifted set of bits, whenever a hidden bit of a mantissa of the summation set of bits is zero, normalizing the mantissa of the summation set of bits by shifting the mantissa of the summation set of bits until the hidden bit is a one, and determining, based on the mantissa of the summation set of bits and the overall sticky bit value, whether to round a floating-point value represented by the summation set of bits.

In some aspects, determining whether to round the floating-point value represented by the summation set of bits includes determining a number of bit positions the mantissa of the summation set of bits were shifted to normalize the mantissa of the summation set of bits and whenever the number of bit positions exceeds a number of precision bits of the multi-input adder other than the sticky bit, determining to round the floating-point value represented by the summation set of bits based on the floating-point value represented by the summation set of bits and the overall sticky bit value.

Some aspects can include preventing the overall sticky bit value from being included in the mantissa of the summation set of bits during normalization by assigning a bit of the mantissa that would represent the overall sticky bit value to zero whenever the overall sticky bit value is non-zero and is shifted to the mantissa during normalization. In some aspects, shifting the mantissa bits of the operand zero or more bit positions comprises shifting the mantissa bits based on a difference between an exponent of the operand and an exponent of the given operand.

In some aspects, identifying a given operand to which each other operand will be aligned comprises identifying the operand having a largest exponent value. In some aspects, the multi-input adder is a four-input adder that has four floating-point inputs and that determines a sum of the four floating-point values received at the four floating-point inputs.

In general, another innovative aspect of the subject matter described in this specification can be embodied in multi-input hardware adders that include three or more inputs configured to receive three or more floating-point operands and adder circuitry. The adder circuitry can be configured to perform operations including receiving, for each of three or more operands to be added by the multi-input hardware adder, a set of bits that include a floating-point representation of the operand. The adder circuitry can identify a given operand to which each other operand will be aligned, for each other operand and generate a shifted set of bits for the operand by shifting mantissa bits of the operand zero or more bit positions such that the bits of the operand align with the bits of the given operand. The adder circuitry can determine, based on the shifting, a value of a sticky bit for each other operand. The sticky bit for an operand can have a non-zero value when a non-zero value was shifted from the set of bits representing the operand to generate the shifted set of bits for the operand. The sticky bit for an operand can have a sign that matches a sign of the operand. The adder circuitry can determine, based on the value of each sticky bit, an overall sticky bit value. The overall sticky bit value can be zero whenever (i) all of the sticky bits for all of the other operands are zero or (ii) at least two of the other operands have sticky bits that are non-zero and do not match. The overall sticky bit value can match the value of each non-zero sticky bit whenever all of the non-zero sticky bits match or there is only one non-zero sticky bit. The adder circuitry can determine a sum of the three or more operands using (i) the set of bits that represent the given operand, (ii) the shifted set of bits for each other operand, and (iii) the overall sticky bit value.

These and other implementations can each optionally include one or more of the following features. In some aspects, determining the sum of the three or more operands can include determining a summation set of bits that represents a sum of the set of bits that represent the given operand and each shifted set of bits. Whenever a hidden bit of a mantissa of the summation set of bits is zero, the mantissa of the summation set of bits can be normalized by shifting the mantissa of the summation set of bits until the hidden bit is a one. The adder circuitry can determine, based on the mantissa of the summation set of bits and the overall sticky bit value, whether to round a floating-point value represented by the summation set of bits.

In some aspects, determining whether to round the floating-point value represented by the summation set of bits can include determining a number of bit positions the mantissa of the summation set of bits were shifted to normalize the mantissa of the summation set of bits and, whenever the number of bit positions exceeds a number of precision bits of the multi-input adder other than the sticky bit, determine to round the floating-point value represented by the summation set of bits based on the floating-point value represented by the summation set of bits and the overall sticky bit value.

In some aspects, the operations can include preventing the overall sticky bit value from being included in the mantissa of the summation set of bits during normalization by assigning a bit of the mantissa that would represent the overall sticky bit value to zero whenever the overall sticky bit value is non-zero and is shifted to the mantissa during normalization.

In some aspects, the operations can include shifting each set of bits to the right a specified number of bit positions prior to determining the sum. In some aspects, shifting the bits for the operand zero or more bit positions can include shifting the bits based on a difference between an exponent of the operand and an exponent of the given operand.

In some aspects, identifying a given operand to which each other operand will be aligned can include identifying the operand having a largest exponent value. In some aspects, the multi-input adder is a four-input adder that has four floating-point inputs and that determines a sum of the four floating-point values received at the four floating-point inputs.

In general, another innovative aspect of the subject matter described in this specification can be embodied in multi-input hardware adders that include three or more inputs configured to receive three or more floating point operands. Each input can be configured to receive set of bits that include a floating-point representation of an operand. The multi-input hardware adders can include an exponent subtraction and swap component configured to identify a given operand to which each other operand will be aligned. The multi-input hardware adders can include one or more shifters configured to generate, for each other operand different from the given operand, a shifted set of bits for the operand by shifting mantissa bits of the operand zero or more bit positions such that the bits of the operand align with the bits of the given operand and determine, based on the shifting, a value of a sticky bit for each other operand. The sticky bit for an operand has a non-zero value when a non-zero value was shifted from the shifted set of bits representing the operand to generate the shifted set of bits for the operand and has a sign that matches a sign of the operand. The multi-input hardware adders can include a sticky bit calculator configured to determine, based on the value of each sticky bit, an overall sticky bit value. The overall sticky bit value is zero whenever (i) all of the sticky bits for all of the other operands are zero or (ii) at least two of the other operands have sticky bits that are non-zero and do not match. The overall sticky bit value matches the value of each non-zero sticky bit whenever all of the non-zero sticky bits match or there is only one non-zero sticky bit. The multi-input hardware adders can include adder circuitry configured to determine a sum of the three or more operands using (i) the set of bits that represent the given operand, (ii) the shifted set of bits for each other operand, and (iii) the overall sticky bit value.

These and other implementations can each optionally include one or more of the following features. In some aspects, the one or more shifters set the sticky bit for an operand to a value of one whenever a non-zero value is shifted into the sticky bit.

In some aspects, the adder circuitry is further configured to determine a summation set of bits that represents a sum of the set of bits that represent the given operand and each shifted set of bits. Whenever a hidden bit of a mantissa of the summation set of bits is zero, the mantissa of the summation set of bits can be normalized by shifting the mantissa of the summation set of bits until the hidden bit is a one. The adder circuitry can determine, based on the mantissa of the summation set of bits and the overall sticky bit value, whether to round a floating-point value represented by the summation set of bits.

In some aspects, determining whether to round the floating-point value represented by the summation set of bits can include determining a number of bit positions the mantissa of the summation set of bits were shifted to normalize the mantissa of the summation set of bits and whenever the number of bit positions exceeds a number of precision bits of the multi-input adder other than the sticky bit, determine to round the floating-point value represented by the summation set of bits based on the floating-point value represented by the summation set of bits and the overall sticky bit value.

In some aspects, the operations can include preventing the overall sticky bit value from being included in the mantissa of the summation set of bits during normalization by assigning a bit of the mantissa that would represent the overall sticky bit value to zero whenever the overall sticky bit value is non-zero and is shifted to the mantissa during normalization. In some aspects, shifting the mantissa bits of the operand zero or more bit positions can include shifting the mantissa bits based on a difference between an exponent of the operand and an exponent of the given operand.

The subject matter described in this specification can be implemented in particular embodiments so as to realize one or more of the following advantages. Multi-input adders described herein can add three or more operands using less power than performing multiple additions using two-input adders as some steps, e.g., normalization and rounding, are performed once by the multi-input adder rather than multiple times (e.g., rather than once per each of the multiple addition operations of the two-input adder). This can also result in faster and more efficient additions as a result of the fewer normalization and rounding steps that need to be performed to determine a sum of more than two operands, which is especially beneficial in integrated circuits that perform many complex mathematical operations such as machine learning accelerator circuits. A multi-input adder also consumes less space on a chip than multiple two-input adders that perform addition operations in parallel, freeing up space for other components or decreasing the size of the chips.

An overall sticky bit value for determining whether and how to round the sum can be computed based on sticky bit values of the operands in a way that ensures that errors caused by rounding are within an acceptable bound and without bias away from zero. That is, by computing the overall sticky bit as described in this document, any bias is towards rounding to zero rather to towards positive or negative numbers. Biasing towards zero in this way minimizes the impact on convergence of machine learning models, such as neural networks. Thus, the described techniques determine the overall sticky bit value in a manner that is optimized for training machine learning models, e.g., when the multi-input adder is on a special-purpose machine learning accelerator chip that performs training of machine learning models.

Various features and advantages of the foregoing subject matter is described below with respect to the figures. Additional features and advantages are apparent from the subject matter described herein and the claims.

BRIEF DESCRIPTION OF THE DRAWINGS

Like reference numbers and designations in the various drawings indicate like elements.

DETAILED DESCRIPTION

Figure 1:
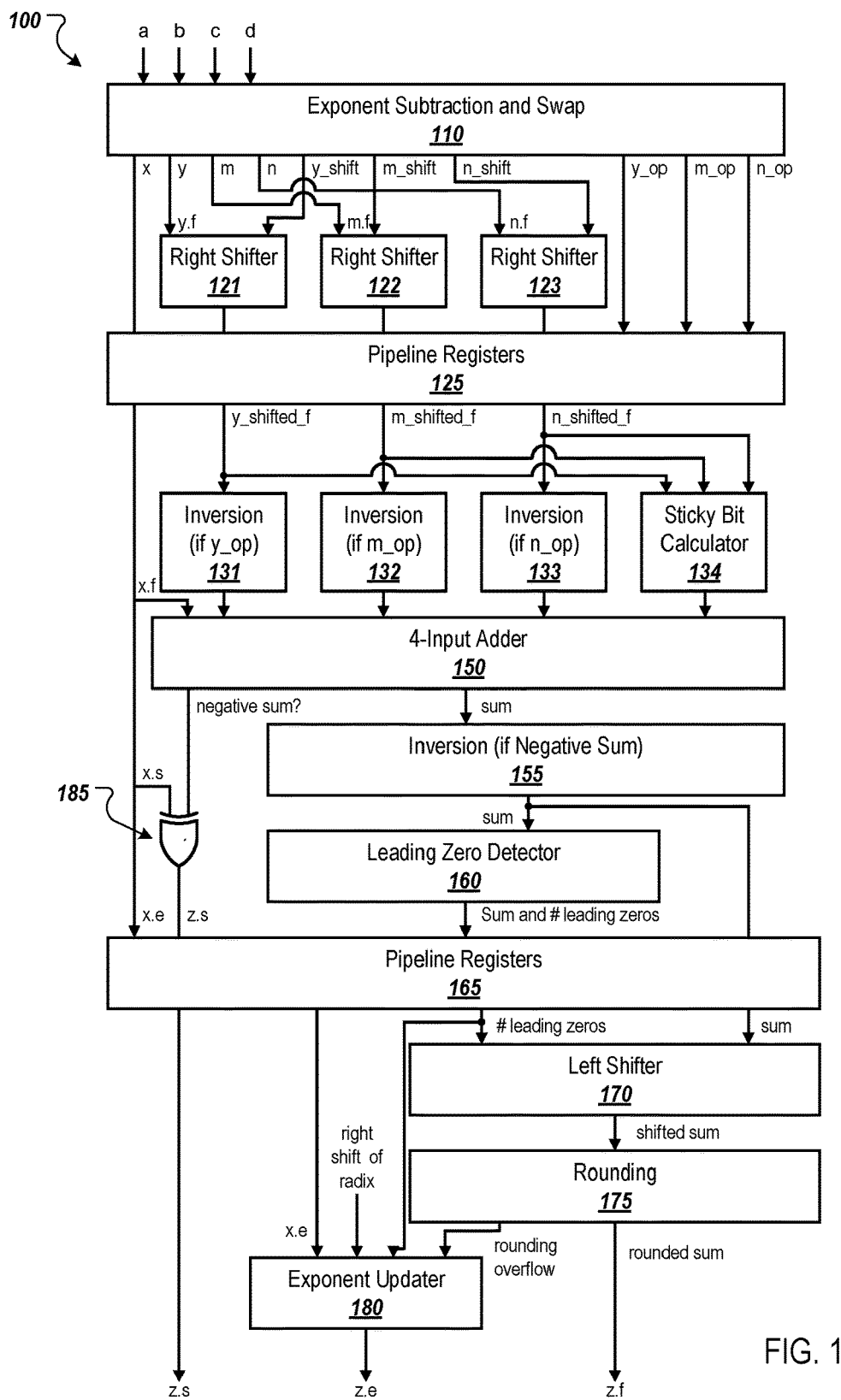
FIG. 1 is a block diagram of an example multi-input hardware adder.

In general, systems and techniques described herein relate to multi-input hardware adders that compute the sum of three or more floating-point inputs. For example, a four-input adder can compute the sum of four floating-point numbers. A floating-point number is represented by a set of bits that include a sign bit that indicates whether the number is positive or negative, exponent bits that represent the value of the exponent for the floating-point number, and mantissa bits (also referred to as the significand) that represent the significant digits of the floating-point number. For example, an IEEE 754 single-precision format floating-point number includes 1 sign bit, 8 exponent bits, and 24 mantissa bits (23 explicitly stored and an implicit hidden bit). To derive the value of the floating-point number, the mantissa is multiplied by the base (e.g., a base of 2) raised to the power of the exponent.

To determine the sum of three or more floating-point operands, the multi-input adder can identify an operand to which each other operand will be aligned. This operand can be the operand having the greatest exponent value. The multi-input adder can then shift the mantissa bits of each other operand based on a difference between the exponent value of the identified operand and the exponent value of the other operand such that the mantissa bits of all of the operands are aligned. When aligned, each operand has the same exponent value.

When shifting the mantissa bits of an operand, some of the mantissa bits may be shifted out of the available bits for representing the floating-point operands. The multi-input adder can include some extra bits for precision and rounding. For example, the multi-input adder can include three extra bits for precision and one sticky bit for internal calculation and rounding. The sticky bit may be in the least significant bit (LSB) position and the three precision bits can be between the sticky bit and the mantissa bits. In this example, if an operand is shifted right more than three bit positions during alignment, one or more of the least significant mantissa bits will be shifted from the available bits and into or through the sticky bit position. The sticky bit is an indication of what could be in lesser significant bits that are not kept after alignment. If a value of one is shifted into the sticky bit position for an operand, the sticky bit remains a one despite further shifts.

The number of precision bits can be selected based on a target error bound for the multi-input adder as the number of precision bits affects the potential number of lost bits due to shifting during alignment. For example, using three precision bits and a sticky bit, the error of a 4-input adder relative to an adder with an infinite number of precision bits is shown in Relationship 1 below. In Relationship 1, the parameter M is the number mantissa bits of each operand (including the hidden bit) and the parameter E is the number of exponent bits of each operand. The parameter z is the output of the 4-input adder, the parameter z_ref is the output of the adder with an infinite number of precision bits, the parameter z_ref.exp is the exponent of the output of the adder, and the parameters a.exp-d.exp are the exponents of the four input operands. The use of ".exp" in this relationship means the actual exponent of the floating point number rather than the stored exponent. The actual exponent of a floating point number can be derived by subtracting a bias from the stored exponent. This relationship is valid if both the parameter z and the parameter z_ref are not infinity or not a number (NaN). If the parameter z or the parameter z_ref is infinity or NaN, the absolute value of the parameter z minus the parameter z_ref is infinity or NaN.

$$|z - z_{ref}| \leq 2^{max(z_{ref}.exp-(M-1),max(a.exp,b.exp,c.exp,d.exp)-(M+(E-1)_{-3}))} \quad (1)$$

The sign of the sticky bit for an operand can be based on whether the sign of the operand is the same as the sign of the operand having the largest exponent value. For example, if the mantissa of an operand having a different sign than the operand with the largest exponent value is treated as a negative value during mantissa addition, the sign of the sticky bit will be positive if the signs are the same and the sign of the sticky bit will be negative if the signs are different.

After aligning the mantissa bits, the multi-input adder can add the mantissas of the operands. As part of the addition, the multi-input adder can also add the extra precision bits. The multi-input adder can then normalize the sum if necessary. For example, if the most significant bit (MSB) has a value of zero, the multi-input adder can shift the mantissa bits of the sum until the MSB has a value of one. The multi-input adder can also determine whether to round the mantissa based on an overall sticky bit value. For multi-input adders that add more than two operands, the calculation of the overall sticky bit needs to be handled carefully to minimize its impact on accuracy and error bias.

The value of the sticky bit may have a larger impact on accuracy and error bias when massive mantissa cancellation happens. Massive mantissa cancellation happens when operands have mantissa values that are being added have close values but with opposite signs, which results in more than one leading zeros in the sum of mantissa before normalization. Massive mantissa cancellation can happen using two-input adders. However, when it happens using two-input adders, the sticky bit is always zero. This is because massive mantissa cancellation can only happen when the exponent difference is less than or equal to one. With massive mantissa cancellation happens using a multi-input adder, the exponent difference between some operand and the operand with the largest exponent might be large, resulting in non-zero sticky bit. Therefore, the calculation of the overall sticky bit needs to be handled carefully.

In some implementations, the multi-input adder determines the overall sticky bit value such that the overall sticky bit value is zero whenever all of the sticky bits for all of the other operands (other than the identified operand having the largest exponent value) are zero. The overall sticky bit values is also zero whenever at least two of the other operands have sticky bits that are non-zero and do not match. For example, if one operand has a sticky bit with a value of −1 and another operand has a sticky bit with a value of +1, the overall sticky bit value would be zero. If all non-zero sticky bits match, e.g., all have a value of +1, the overall sticky bit value can be the same as the non-zero sticky bits, +1 in this example.

FIG. 1 is a block diagram of an example multi-input hardware adder 100. In this example, the multi-input adder 100 is a four-input adder in the form of a hardware circuit including several components for determining the sum of four floating-point operands. However, the multi-input adder 100 can be configured to determine the sum of three floating-point operands, five floating-point operands, or another appropriate number of floating-point operands, as described below.

The multi-input adder 100 can determine the sum of floating-point numbers having a given format. The format can be defined by the number of bits used to represent the various parts of the floating-point numbers. As described above, the IEEE 754 single-precision format floating-point number includes 1 sign bit, 8 exponent bits, and 24 mantissa bits (23 explicitly stored and an implicit hidden bit). The multi-input adder 100 can be configured to determine the sum of these 32-bit single-precision format floating point numbers. In another example, the multi-input adder 100 can be configured to determine the sum of 24-bit numbers that include 1 sign bit, 8 exponent bits, and 16 mantissa bits (15 explicitly stored and an implicit hidden bit), or other floating-point format numbers. To configure the multi-input adder for a particular format, the adder 150 (described in more detail below) can be configured to add mantissas having a particular number of bits and be configured to include additional bits, including a sticky bit, for internal calculation and rounding.

The multi-input adder 100 includes an exponent subtraction and swap component 110 that receives, as input, four floating-point operands (a, b, c, and d) and assigns them to intermediate operands (x, y, m, and n) based on the exponent values of the input operands. The exponent and subtraction and swap component 110 can assign the input operand having the largest exponent value to operand x and the other input operands to intermediate operands y, m, and n. If all operands have the same exponent value, the exponent subtraction and swap component 110 can assign input operand a to intermediate operand x, input operand b to intermediate operand y, input operand c to intermediate operand m, and input operand d to intermediate operand n.

The exponent subtraction and swap component 110 can include one or more swap units, one or more subtractors, and/or one or more absolute value calculators. For example, the exponent subtraction and swap component 110 can include three swap units, four 8-bit subtractors (based on the number of exponent bits), and two absolute value calculators. The quantity of each of these components and the configuration of these components can vary based on the number of inputs of the multi-input adder 100 and/or the number of exponent bits of the input operands for which the multi-input adder 100 is configured to add. For example, if the input operands have four exponent bits, the subtractors can be 4-bit subtractors.

The exponent subtraction and swap component 110 identifies the input operand with the largest exponent value and calculates the difference between the exponent value of this operand and the exponent value of each other input operand. In hardware, a subtractor can determine a difference between the exponent value of input operand a and the exponent value of input operand b. A subtractor can also determine the difference between the exponent value of operand c and the exponent value of operand d.

The swap units can then assign the input operands to intermediate operands using Relationships 2 and 3 below:

$$(p,m)=(a,b) \text{ if } a.e-b.e \geq 0; \text{ else } (p,m)=(b,a) \quad (2)$$

$$(r,n)=(c,d) \text{ if } c.e-d.e \geq 0; \text{ else } (r,n)=(d,c) \quad (3)$$

Parameters with ".e" after the operand name refer to the exponent value of the operand. For example, the parameter a.e is the exponent value for input operand a. After this initial swap, the two of the input operands have been assigned to their intermediate operands m and n.

A subtractor can then determine the difference between p.e and r.e after the previous swap. The swap units can then assign input operands to intermediate operands x and y using Relationship 4 below:

$$(x,y)=(p,r) \text{ if } p.e-r.e \geq 0; \text{ else } (x,y)=(r,p) \quad (4)$$

The exponent subtraction and swap component 110 can then determine how many bit positions to shift the mantissas of the intermediate operands y, m, and n based on a difference between the exponent values of these operands and the intermediate operand x. For example, the exponent subtraction and swap component 110 can determine how many bit positions to shift the mantissa of each intermediate operand using Relationships 5, 6, and 7 below:

$$y\_shift=|p.e-r.e| \quad (5)$$

$$m\_shift=|a.e-b.e| \text{ if } p.e-r.e \geq 0; \text{ else } m\_shift=(x.e-m.e) \quad (6)$$

$$n\_shift=x.e-n.e \text{ if } p.e-r.e \geq 0; \text{ else } n\_shift=|c.e-d.e| \quad (7)$$

The parameters with "_shift"" after the operand name refer to the number of bit positions to shift that operand, e.g., m_shift is the number of bit positions to shift operand m. Using the logic above, the exponent subtraction and swap component 110 assigns the input operands a, b, c, and d to x, y, m, and n such that x.e is greater than or equal to y.e, m.e, and n.e. The exponent subtraction and swap component 110 also determines the number of bit positions to shift the mantissa of the operands y, m, and n such that the shift for operand y equals the difference between x.e and y.e, the shift for operand m equals the difference between x.e and m.e, and the shift for operand n equals the difference between x.e and n.e.

The exponent subtraction and swap component 110 can also determine whether any of the intermediate operands y, m, or n are to be inverted based on the signs of each operand relative to the sign of the intermediate operand x. If the intermediate operand should be inverted, the exponent subtraction and swap component 110 can set the value of an inversion operation "_op" parameter (e.g., stored as a bit) for the operand to a value of one. The exponent subtraction and swap component 110 can use Relationships 8, 9, and 10 to determine whether to invert the intermediate operands y, m, or n:

$$y_{op} = x.s \text{ XOR } y.s \quad (8)$$

$$m_{op} = x.s \text{ XOR } m.s \quad (9)$$

$$n_{op} = x.s \text{ XOR } n.s \quad (10)$$

The exponent subtraction and swap component 110 outputs the intermediate operand to pipeline registers 125. The exponent subtraction and swap component 110 also outputs the inversion operation parameters to pipeline registers 125. The pipeline registers 125 and 165 are used to separate the datapath of the multi-input adder 110 into stages. In this example, the datapath includes a first alignment stage before the pipeline registers 125, a second addition stage between the pipeline registers 125 and the pipeline registers 165, and a third normalization and rounding stage after the pipeline registers 125 and 165. The other components can obtain the data needed for their operations from the pipeline registers 125 and 165.

The pipeline registers 125 can store the sign, exponent, and mantissa for each intermediate operand. For example, the pipeline registers 125 can store, for operand x, x.sign (the sign value), x.exponent (the exponent value), and x.mantissa (the mantissa value). For the other operands, the pipeline register 125 can store the shifted mantissa (e.g., y_shifted_f for operand y). The shifted mantissa for a shifted operand can include the extra precision bits and the sticky bit for the operand. The pipeline registers 125 can also store the values of the inversion operation "_op" parameters (e.g., y_op, m_op, and n_op).

The pipeline registers 125 can also store a value of a result_is_special parameter. There can be special cases in which the one or more of the input operands is NaN, one or more of the input operands is infinity, or all input operands are zeros or denormals (floating point numbers with zero exponent and non-zero mantissa). In either case, the value of result_is_special can be one to indicate that the result of the addition is one of the special cases.

Although not shown in FIG. 1, the multi-input hardware adder 100 can include additional components or logic for handling the special cases. For example, the multi-input adder 100 can output a final result (z) that is NaN if at least one of the input operands is NaN or at least two of the input operands are infinity with opposite signs. In another example, the multi-input hardware adder 100 can output a final result (z) that is zero if all input operands are zeros or denormals. In another example, the multi-input hardware adder can output a final result (z) that is positive or negative infinity if at least one of the input operands is infinity and all operands that are infinity have the same sign. The multi-input hardware adder 100 can treat denormals as appropriately signed zeros and flush denormal results to zeros.

The exponent subtraction and swap component 110 also outputs the mantissa bits (parameters with ".f" in FIG. 1) and the shifts for the operands y, m, and n to respective right shifters 121, 122, and 123. The multi-input adder 100 can include a right shifter for each operand that is not the operand having the greatest exponent value. Thus, the multi-input adder 100 can include n−1 right shifters, where n is the number of input operands for the multi-input adder 100. In this example, a 6-input adder would have five right shifters. In other examples, fewer right shifters can be used, and each right shifter can shift more than one operand per addition operation.

The right shifter 121 can shift the mantissa bits y.f for operand y based on y_shift. For example, if y_shift is five (meaning the difference between the exponent value for x is five greater than the exponent value of y), the right shifter 121 can shift the mantissa bits y.f for operand y five bit positions to the right. Similarly, the right shifter 122 can shift the mantissa bits m.f for operand m based on m_shift, and the right shifter 123 can shift the mantissa bits n.f for operand n based on n_shift. If the shift for an operand is zero, the mantissa of the operand is not shifted, e.g., is shifted zero bit positions. After the operands are shifted, if appropriate, the exponent values of each operand x, y, m, and n are the same. That is, the exponent value of y, m, and n, now equal the exponent value of operand x due to the shifting of the mantissas. Each right shifter 121, 122, and 123 can output a shifted version of its mantissa, which has been shifted zero or more bit positions. For example, the right shifter 121 can output a shifted version (y_shifted_f) of the mantissa of operand y; the right shifter 122 can output a shifted version (m_shifted_f) of the mantissa of operand m; and the right shifter 123 can output a shifted version (n_shifted_f) of the mantissa of operand n.

In some implementations, the multi-input adder 100 includes additional bits for the mantissas for precision and rounding. For example, the multi-input adder 100 can include one or more precision bits to the right of the mantissa and a sticky bit to the right of the one or more precision bits. When the mantissa of an operand is shifted to the right, the LSBs of the mantissa are shifted into the precision bit location(s) and, if shifted enough, into the sticky bit location and potentially out of the available bits for the mantissa. In this way, if the mantissa of an operand is shifted fewer bit positions than the number of precision bits, the values of the bits shifted into the precision bit locations can be maintained.

For example, the multi-input adder 100 can store a 24-bit mantissa using 28 bits. In this example, the 24 mantissa bits can be the 24 MSBs. The next three bits can be precision bits and the LSB can be the sticky bit. If the mantissa of an operand is shifted to the right three bit positions, the LSB of the mantissa would be stored in the third precision bit location. However, if the mantissa of an operand is shifted to the right five bit positions, the LSB would be shifted out of the available bit locations.

The sticky bit for an operand is used to represent what may have been shifted from the available bit locations. If a value of one is ever shifted into the sticky bit location, the sticky bit is set to a value of one. The sticky bit value can remain a value of one after being set to that value even if a zero is later shifted into the sticky bit location, e.g., if a more significant bit has a value of zero and is shifted into the sticky bit location after a less significant bit with a value of one was shifted into the sticky bit location.

The sign of the sticky bit for an operand can be based on whether the sign of the operand is the same as the sign of the operand having the largest exponent value. If the signs are the same, the sign of the sticky bit is positive. If the signs are different, the sign of the sticky bit is −1.

In some implementations, if all of the mantissa bits of an operand are shifted from the available bit positions, the sticky bit for the operand can have a value of zero. For example, the right shifter that is shifting the mantissa bits can set the sticky bit to zero if all mantissa bits are shifted out of the available bit positions.

The multi-input adder 110 also includes inversion components 131, 132, and 133 that can perform inversion operations on the shifted mantissa bits if the inversion operation parameter for the operand is set to a value of one. For example, each inversion component 131-133 can perform two's complement inversion on the mantissa bits of an operand if the inversion operation parameter for the operand is set to a value of one. In this way, adding the mantissa of another operand to the inverted mantissa results in a subtraction operation between the two mantissas.

The multi-input adder 110 also includes a sticky bit calculator 134. The sticky bit calculator 134 can calculate an overall sticky bit value for the sum (e.g., for a summation set of bits that represents the sum of the mantissas). The sticky bit calculator 134 can calculate the overall sticky bit value such that the overall sticky bit value is zero whenever all of the sticky bits for operands y, m, and n are zero. The overall sticky bit value is also zero whenever at least two of the other operands have sticky bits that are non-zero and do not match. If all non-zero sticky bits match, e.g., all have a value of +1, the overall sticky bit value can be the same as the non-zero sticky bits, +1 in this example.

For example, if the sticky bit for operand y is +1, the sticky bit for m is +1, and the sticky bit for n is 0, the overall sticky bit value would be +1 as all non-zero sticky bits are +1. In another example, if the sticky bit for operand y is −1, the sticky bit for m is 0, and the sticky bit for n is 0, the overall sticky bit value would be −1 as the only non-zero sticky bit has a value of −1. In another example, if the sticky bit for operand y is −1, the sticky bit for m is −1, and the sticky bit for n is −1, the overall sticky bit value would be −1 as all sticky bits have a value of −1. In another example, if the sticky bit for operand y is +1, the sticky bit for m is −1, and the sticky bit for n is −1, the overall sticky bit value would be 0 as the values of all of the non-zero sticky bits for all of the operands y, m, and n do not match. In yet another example, if the sticky bit for operand y is 0, the sticky bit for m is 0, and the sticky bit for n is 0, the overall sticky bit value would be 0 as all of the sticky bits have a value of zero.

In some implementations, the sticky bit calculator 134 can assign the overall sticky bit to one of the operands (y, m, or n) and clear the sticky bit for the other operands before the inversion components 131, 132, and 133 perform inversion operations on the shifted mantissa bits. If the overall sticky bit is +1, the sticky bit calculator 134 sets the sticky bit of one operand that has the same sign as operand x to one and sets the sticky bit of the other two operands to zero. If the overall sticky bit is −1, the sticky bit calculator 134 sets the sticky bit of one operand that has the opposite sign of operand x to one and sets the sticky bit of the other two operands to zero.

The multi-input adder 100 also includes a four-input mantissa adder 150 that adds the mantissas, precision bits, and the sticky bit of the operands x, y, m, and n. For example, the four-input adder 150 can add the original mantissa of operand x to the shifted versions of the mantissas (and their precision and sticky bits) for operands y, m, and n. The precision bits and sticky bit for operand x would be zero as the mantissa of operand x is not shifted. For different numbers of inputs, the multi-input adder 100 can include an adder that computes the sum of that number of mantissas.

The adder 150 can output a summation set of bits that represents the sum of the four mantissas and their precision and sticky bits. For example, if the two overflow bits are included, the summation set of bits can include 31 bits, which includes the two overflow bits, the 24 mantissa bits, the three precision bits, one bit for 2's complement conversion, and the final sticky bit. If the two overflow bits are not included, the summation set of bits can include the other 29 bits. Of course, other formats are also possible based on the format of the input operands, desired precision, etc.

The multi-input adder 100 also includes an inversion component 155 that can invert the sum of the mantissas if the sign for the sum is negative. For example, the inversion component 155 can invert the sum of the mantissas using two's complement inversion if the sum is less than zero.

In some implementations, the multi-input adder shifts the radix of the summation set of bits to the right one or more bit positions (e.g., two bit positions for 2-bit overflow) by remapping the summation set of bits output by the adder. This can prevent having to perform right shifting in the case of overflow. For example, if the input operands include 24 mantissa bits each, and the multi-input adder 100 can store the mantissas using 29 bits. These 29 bits can include the 24 mantissa bits, three precision bits, one bit for 2's complement conversion (at MSB), and one bit for the sticky bit position (LSB). The output of the inversion component 155 can include two overflow bits, the 24 mantissa bits, the three precision bits and the sticky bit for the sum. The multi-input adder can consider the MSB of the overflow bits as the hidden bit of the mantissa, the next 23 bits as the rest of the mantissa, the next 5 bits as extra precision bits and the LSB as the sticky bit. The number of shifts to the right of the radix affects the exponent value of the sum. For example, if the radix of the sum is shifted to the right two bit positions, the number 2 can be added to the exponent value of the sum, as described below.

The multi-adder 100 also includes a leading zero detector 160. The leading zero detector 160 can determine whether there are any leading zeros in the mantissa of the summation set of bits. If so, the sum represented by the summation set of bits can be normalized such that the MSB has a value of one in the MSB of the mantissa. The leading zero detector 160 can determine a number of leading zeros in the mantissa and provide the summation set of bits and the number of leading zeros to a left shifter 170.

The left shifter 170 can shift the summation set of bits to the left until the MSB of the mantissa has a value of one. The left shifter 170 can shift the summation set of bits to the left based on the number of leading zeros. For example, if the mantissa has two leading zeros, the left shifter 170 can shift each bit of the summation set of bits two bit positions to the left.

The left shifter 170 can also prevent the value of the sticky bit from being shifted into the mantissa bits. If the sticky bit in the summation set of bits will be shifted into the mantissa bits, the sticky bit can be set to a value of zero. The sticky bit will also be set to zero if all extra precision bits will be shifted into the mantissa bits. The left shifter can use the number of leading zeros (which represents the number of bit positions the summation set of bits will be shifted) to determine whether the sticky bit will be shifted into the mantissa bits. If no extra bits are used for overflow and three precision bits are used, then the value of the sticky bit would be shifted into the mantissa if the summation set of bits is shifted three or more positions to the left. In this case, if the sticky bit has a non-zero value, the value shifted into the mantissa for the sticky bit can be replaced with a value of zero.

The multi-input adder 100 also includes a rounder 175. The rounder 175 can round the mantissa based on the value of the LSB of the mantissa and all the bits on the left, which may include the sticky bit, the extra precision bits, and the bits from the mantissa region that have been right shifted out of the region when normalizing the mantissa overflow case. In some implementations, the rounder 175 rounds using a round to the nearest, half to even rounding technique. Other rounding techniques can also be used.

Using a round to the nearest, half to even rounding technique, if the value of the bits being truncated from mantissa (e.g., the values of the precision bits after shifting and the sticky bit following the precision bits) is more than half of the value of the LSB of the mantissa, the value of the mantissa will be rounded up. If the value of the bits being truncated is less than half the value of the LSB of the mantissa, the value of the mantissa will be rounded down. If the value of the bits being truncated is half the value of the LSB of the mantissa, the value of the mantissa will be rounded down if the LSB of the mantissa is zero or the value of the mantissa will be rounded up if the LSB of the mantissa is one. The rounded mantissa bits can be output as the mantissa (z.f) of the sum of the four input operands if none of the special cases occurs (e.g., where z is NaN, infinity, of zero).

The multi-input adder also includes an exponent updater 180 that determines the exponent value of the sum. The exponent value can be equal to a sum of the exponent of operand z (x.e), any rounding overflow (e.g., if rounding causes the mantissa to overflow the most significant bit), and the number of bit positions the radix of the sum was shifted to the right (if any), minus the number of bit positions the summation set of bits was shifted to the left by the left shifter 170 (e.g., which is the same as the number of leading zeros determined by the leading zero detector 160). The exponent updater 180 can output the exponent (z.e) for the sum of the four input operands.

The multi-input adder 100 also includes an XOR gate 185 that performs exclusive disjunction on the sign bit of the operand x (which is one if negative) and a bit representing whether the sum output by the adder is negative (which is also one if negative). If both bits have the same value, then the output of the XOR gate 185 is a zero. That is, if the signs are the same (i.e., both positive or both negative), then the sign of the sum (z.s) is positive. If the bits have different values, then the output of the XOR gate is a one. That is, if the signs are different, then the sign of the sum (z.s) is negative.

Figure 2:
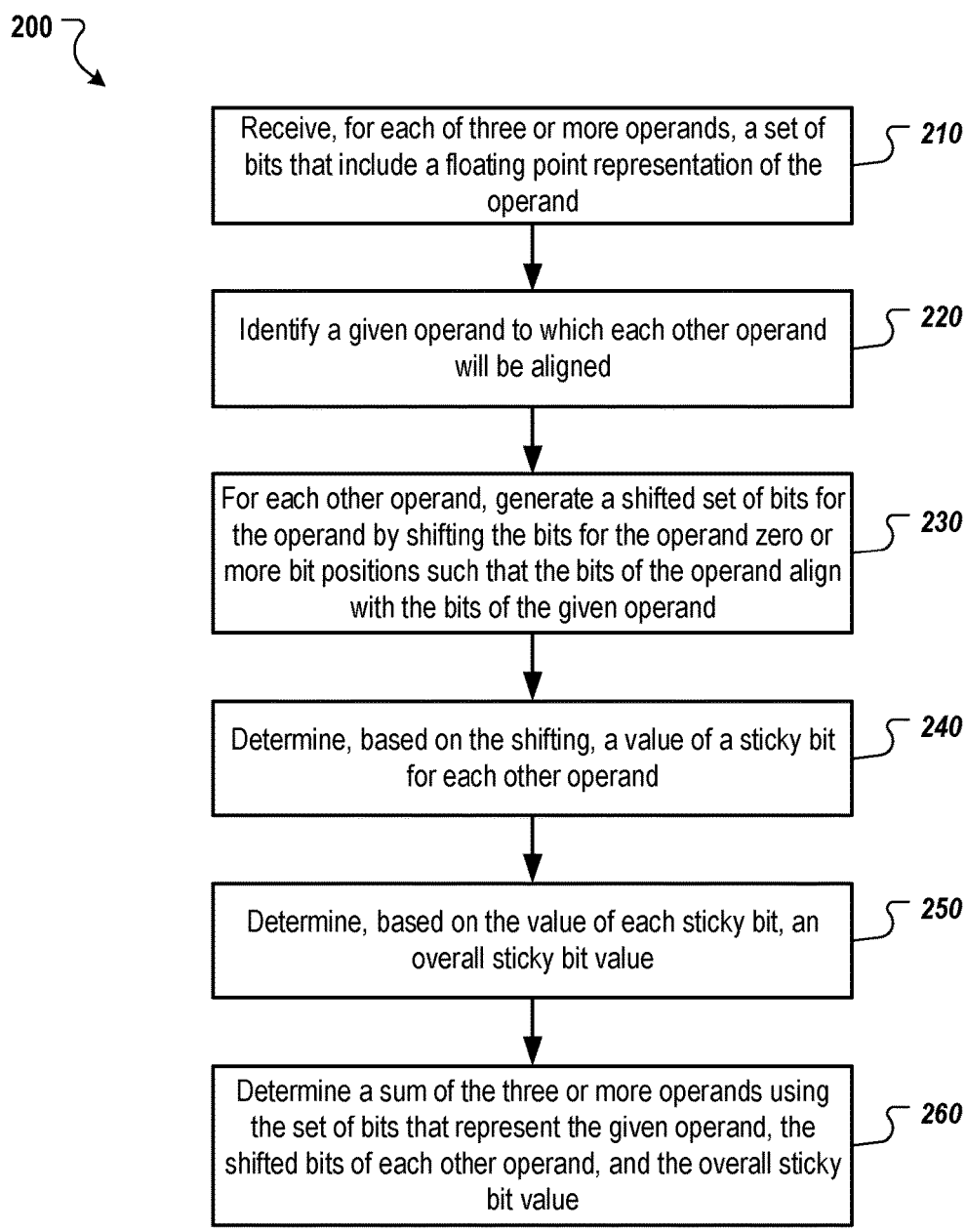
FIG. 2 is a flow diagram that illustrates an example process for adding three or more operands.

FIG. 2 is a flow diagram that illustrates an example process 200 for adding three or more operands. Operations of the process 200 can be performed by a multi-input hardware adder, such as the multi-input adder 100 of FIG. 1. FIG. 2 is described with reference to FIG. 3, which illustrates an example of four operands added using a four-input adder.

The multi-input adder has three or more floating-point inputs. Each input is configured to receive a floating-point operand to be added to two or more other operands. The multi-input adder can be configured to determine the sum of floating-point operands in a particular format, e.g., having a sign bit, a particular number of exponent bits, and a particular number of mantissa bits. As described above, the multi-input adder can use extra bits for precision and to track a sticky bit for the mantissa due to the alignment steps.

The multi-input adder receives, for each of three or more operands to be added by the multi-input adder, a set of bits that include a floating-point representation of the operand (210). For example, the set of bits for an operand can include a sign bit that represents a sign of the operand, exponent bits that represent an exponent value for the operand, and mantissa bits that represent the significant digits of the floating-point number.

Figure 3:
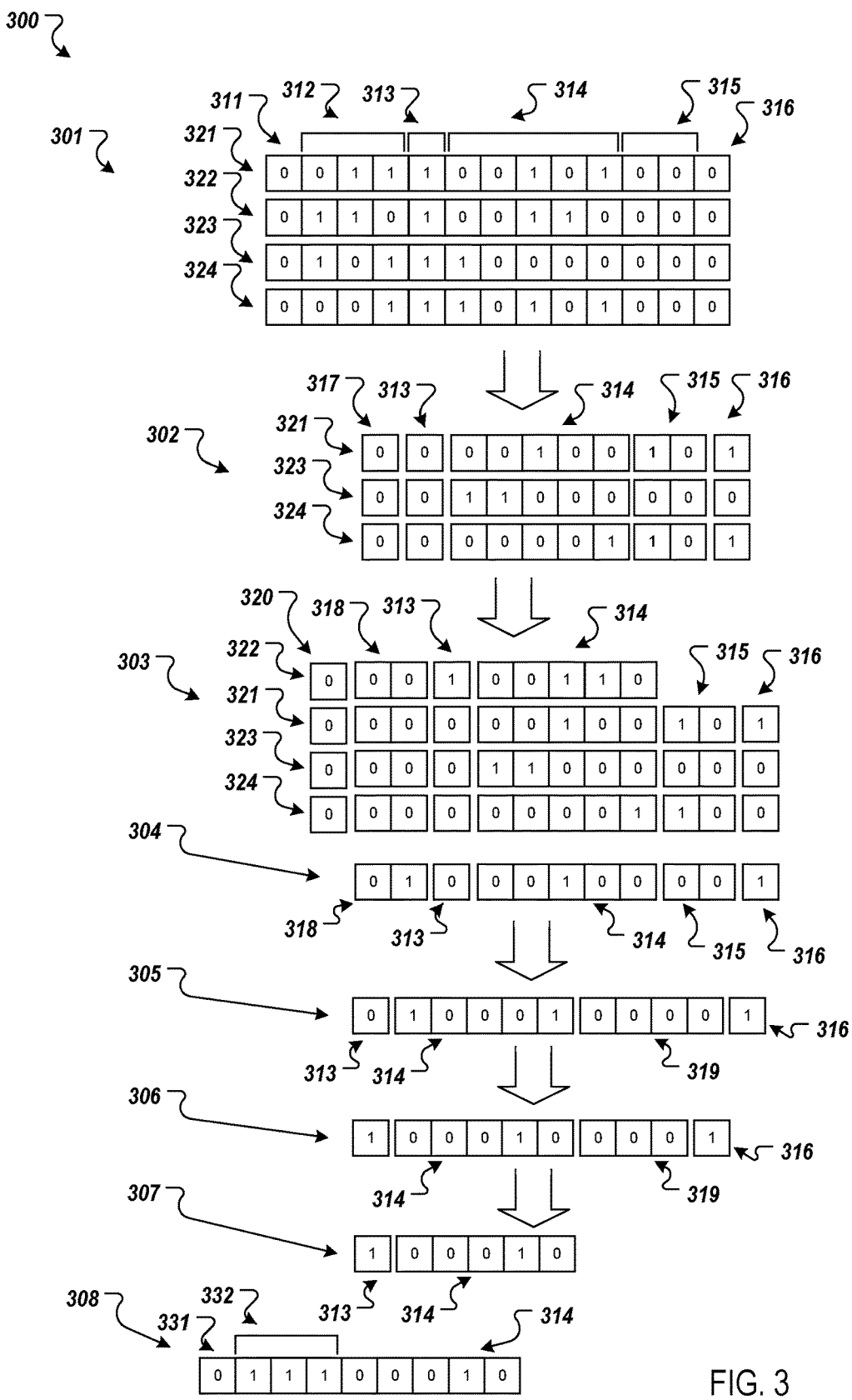
FIG. 3 illustrates an example of four operands added using a four-input adder.

Within the multi-input adder, the operands can include the hidden bit, extra bits for precision, and a sticky bit. In the example of FIG. 3, as shown at reference numeral 301, each operand 321-324 includes a sign bit 311, three exponent bits 312, a hidden bit 313, five mantissa bits 314, two precision bits 315, and a sticky bit 316. For example, the multi-input adder can receive a 9-bit input operand (e.g., one sign bit 311, three exponent bits 312, and five mantissa bits 314) in a 13-bit format with one sign bit 311, three exponent bits 312, six mantissa bits 313 and 314 including the hidden bit 313, two precision bits 315, and one sticky bit 316. As described above, a multi-input adder can include extra bits for internal calculation and rounding. In this example, the multi-input adder includes two precision bits 315 and a sticky bit 316 for each operand. Other numbers of precision bits can also be used based on the target precision of the multi-input adder.

The multi-input adder identifies a given operand to which each other operand will be aligned (220). For example, the multi-input adder can identify the operand having the largest exponent value as the given operand to which each other operand will be aligned. In this example, the operand 322 has the greatest exponent value (110 in binary or 6 in decimal).

For each other operand, the multi-input adder generates a shifted set of bits for the operand (230). The multi-input adder can generate the shifted set of bits by shifting the bits for the operand one or more bit positions such that the bits of the operand align with the bits of the given operand. For example, the multi-input adder can determine, for each operand, a difference between the exponent value of the given operand and the other operand. If the difference is zero, the other operand may not be shifted, e.g., shifted zero bit positions.

The multi-input adder can then shift the mantissa bits of the other operand to the right (i.e., from the most significant side of the mantissa towards the least significant side of the mantissa) a number of bit positions equal to the difference between the exponent value of the given operand and the exponent value of the other operand. For example, if the exponent value for the given operand is 5 and the exponent value of the other operand is 3, the multi-input adder can shift the mantissa bits of the other operand 2 bit positions to the right.

As shown at reference numeral 302, the mantissa bits of each other operand 321, 323, and 324 have been shifted. The mantissa bits of the operand 321 were shifted to the right three bit positions as the exponent value for the operand 321 is 011 in binary or 3 in decimal. As the difference between the exponent value of the operand 322 and the operand 321 is 3 (6−3), the mantissa bits of the operand 321 were shifted to the right three bit positions. Due to the shift, the precision bits 314 for the operand 321 has a one and a zero. The other two operands 323 and 324 were also shifted to the right based on the difference between the exponent value of the operand 322 and their respective exponent value.

In this example, the other operands 321, 323, and 324 also include an inversion operation bit 317. The inversion operation bit 317 for an operand is set to one if the sign of the operand is different from the sign of the operand 322 having the largest exponent value. If the inversion operation bit 317 is set to one, the multi-input adder performs two's complement inversion on the mantissa bits of the operand. In this way, adding the mantissa of another operand to the inverted mantissa results in a subtraction operation between the two mantissas.

The multi-input adder determines, based on the shifting, a value of a sticky bit for each other operand (240). The sticky bit for an operand has a non-zero value when a non-zero value was shifted from the set of bits representing the operand to generate the shifted set of bits for the operand. The sticky bit value for an operand also has a sign that matches a sign of the operand.

As shown at reference numeral 302, the sticky bit 316 for the operand 321 has a value of one as the LSB of the original mantissa of the operand 321 was shifted three bit positions into the sticky bit 316. If the mantissa bits of the operand were shifted four bit positions instead of three, the sticky bit 316 for the operand would still have a value of one even though a zero would be shifted into that bit position. This is because once the sticky bit for an operand is set to a non-zero value during alignment, the sticky bit remains that value.

The multi-input adder determines, based on the value of each sticky bit, an overall sticky bit value (250). A described above, the overall sticky bit value is zero whenever (i) all of the sticky bits for all of the other operands are zero or (ii) at least two of the other operands have sticky bits that are non-zero and do not match (e.g., the sign bits of the operands that have non-zero sticky bits do not match). The overall sticky bit value matches the value of each non-zero sticky bit whenever all of the non-zero sticky bits match or there is only one non-zero sticky bit. In this example, the overall sticky bit value for the sum is one as there are two non-zero sticky bits (the sticky bits for operands 321 and 324) and they both match by having a value of one.

As described above, the multi-input adder can assign the overall sticky bit value to one of the other operands 321, 323, or 324 and clear the sticky bit value for each other operator, e.g., by assigning a value of zero to each other sticky bit value. In this example, the multi-input adder assigned the overall sticky bit value to the operand 321 and cleared the sticky bit value for operand 324, as shown at reference numeral 303.

The multi-input adder determines a sum of the three or more operands using (i) the set of bits that represent the given operand, (ii) the shifted set of bits for each other operand, and (iii) the overall sticky bit value. As described above, the multi-input adder can first add the mantissa bits of the operand having the largest exponent value to the shifted mantissa bits of the other operands. The sum can be represented as a summation set of bits 304.

Prior to adding the operands, the multi-input adder can add overflow bits for each operand 321-324. For example, as shown at reference numeral 303, each operand 321-324 includes a 2's complement bit 320, two overflow bits 318 that have a value of zero, a hidden bit 313, five mantissa bits 314, two precision bits 315, and a sticky bit 316. The multi-input adder can add the sets of bits for the operands 321-324 as shown at reference numeral 303 to determine the summation set of bits 304. The summation set of bits 304 represents an unsigned sum of the operands 321-324. The summation set of bits 304 includes two overflow bits 318, a hidden bit 313, five mantissa bits 314, two precision bits 315, and a sticky bit 316 that represents the overall sticky bit value.

As described above, the multi-input adder can shift the radix of the sum (e.g., two bit positions) to the right prior to normalization. This shift may not be an actual shift of the values in the summation set of bits. Instead, this shift may be a remapping of the bit positions. For example, the multi-input adder can generate a remapped summation set of bits 304 that includes a hidden bit 313 (that has the value of the MSB of the overflow bits 318), five mantissa bits 314 (that includes the LSB of the overflow bits 318, the hidden bit 313 of the summation set of bits 304, and the first three MSBs of the mantissa 314 of the summation set of bits 304), four extra bits 319 (that includes the two LSBs of the mantissa 314 of the summation set of bits 304 and the precision bits 315 of the summation set of bits 304), and the sticky bit 316. The multi-input adder can also add the number of bits positions of the shift (e.g., two in this example) to the exponent value for the sum based on this shift.

The multi-input adder can then normalize the summation bits that represent the sum. The normalization can include shifting the mantissa bits of the summation set of bits to the left if the mantissa bits include any leading zeros. For example, the multi-input adder can shift the mantissa bits and the precision bits to the left one position for each leading zero in the mantissa so that the most significant bit of the mantissa has a value of one.

In this example, the summation set of bits 305 includes one leading zero in the MSB. Thus, the multi-input adder can shift the summation set of bits 305 to the left one bit position resulting in the summation set of bits 306. At this point, the MSB of the summation set of bits is the hidden bit 313 with a value of one. The summation set of bits 306 includes the hidden bit 313, five mantissa bits 314, three additional bits 319 and the sticky bit 316. The multi-input adder can also update the exponent of the sum based on the shift. For example, the multi-input adder can subtract, from the exponent of the sum, the number of bit positions the summation set of bits 305 were shifted to the left to arrive at the normalized summation set of bits 306. In this example, the multi-input adder can subtract a value of one from the exponent value of the sum.

The sum can then be rounded based on the precision bits and the overall sticky bit value. As described above, the sum can be rounded using a round to the nearest, half to even rounding technique. Using a round to the nearest, half to even rounding technique, if the value of the bits being truncated from mantissa (e.g., the values of the precision bits after shifting and the overall sticky bit value following the precision bits) is more than half of the value of the LSB of the mantissa, the value of the mantissa will be rounded up. If the value of the bits being truncated is less than half the value of the LSB of the mantissa, the value of the mantissa will be rounded down. If the value of the bits being truncated is half the value of the LSB of the mantissa, the value of the mantissa will be rounded down if the LSB of the mantissa is zero or the value of the mantissa will be rounded up if the LSB of the mantissa is one. The rounded mantissa bits can be output as the mantissa (z.f) of the sum of the four input operands if none of the special cases occurs (e.g., where z is NaN, infinity, of zero).

In this example, the LSB of the mantissa is zero, each of the extra precision bits 319 has a value of zero and the sticky bit has a value of one. The value of the bits being truncated is 0.0625, which is less than half of one (the value of the LSB of the mantissa). Thus, the LSB of the mantissa of the summations set of bits is not rounded, as shown at reference numeral 307, which shows the mantissa 314 of the sum of the four operands 321-324. The hidden bit 313 can be dropped and the multi-input adder can output a 5-bit mantissa 314.

In addition, the multi-input adder can determine a sign 331 of the sum and an exponent value 332 for the sum. As described above, the sign 331 of the sum can be the output of an XOR operation on the sign of the operand having the largest exponent value and the sign of the output of the mantissa adder 150. In this example, the sign 331 of the sum is positive as all four operands were positive. The exponent value 332 for the sum is based on the exponent value of the operand 322 that has the largest exponent value, the number of bit positions the radix was shifted to the right during remapping to generate the summation set of bits 305 (if this was performed) and the number of bit positions the summation set of bits 305 were shifted left during normalization to generate the summation set of bits 306. For example, the exponent value 332 can be the sum of the exponent value of the operand 322 and the number of bits positions the radix was shifted to the right, minus the number of bit positions the sum was shifted to the left during normalization. In this example, the exponent value 332 would be seven (e.g., 6+2−1).

A set of bits 308 that represents the sum can be generated with a sign bit 331, exponent bits 332 that represent the determined exponent value, and mantissa bits 314 that represent the mantissa of the sum. For example, the multi-input adder can output each set of bits to respective memory locations of one or more bytes of memory for the sum.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method performed by a multi-input hardware adder that has three or more floating-point inputs, the method comprising:
   receiving, for each of three or more operands to be added by the multi-input hardware adder, a set of bits that include a floating-point representation of the operand;
   identifying a given operand to which each other operand will be aligned;
   for each other operand, generating a shifted set of bits for the operand by shifting mantissa bits of the operand zero or more bit positions such that the bits of the operand align with the bits of the given operand;
   determining, based on the shifting, a value of a sticky bit for each other operand, wherein the sticky bit for an operand:
      has a non-zero value when a non-zero value was shifted from the set of bits representing the operand to generate the shifted set of bits for the operand; and
      has a sign that matches a sign of the operand;
   determining, based on the value of each sticky bit, an overall sticky bit value, wherein:
      the overall sticky bit value is zero whenever (i) all of the sticky bits for all of the other operands are zero or (ii) at least two of the other operands have sticky bits that are non-zero and do not match; and
      the overall sticky bit value matches the value of each non-zero sticky bit whenever all of the non-zero sticky bits match or there is only one non-zero sticky bit; and
   determining a sum of the three or more operands using (i) the set of bits that represent the given operand, (ii) the shifted set of bits for each other operand, and (iii) the overall sticky bit value.

2. The method of claim 1, wherein determining the sum of the three or more operands comprises:
   determining a summation set of bits that represents a sum of the set of bits that represent the given operand and each shifted set of bits;
   whenever a hidden bit of a mantissa of the summation set of bits is zero, normalizing the mantissa of the summation set of bits by shifting the mantissa of the summation set of bits until the hidden bit is a one; and determining, based on the mantissa of the summation set of bits and the overall sticky bit value, whether to round a floating-point value represented by the summation set of bits.

3. The method of claim 2, wherein determining whether to round the floating-point value represented by the summation set of bits comprises:

determining a number of bit positions the mantissa of the summation set of bits were shifted to normalize the mantissa of the summation set of bits; and whenever the number of bit positions exceeds a number of precision bits of the multi-input adder other than the sticky bit, determining to round the floating-point value represented by the summation set of bits based on the floating-point value represented by the summation set of bits and the overall sticky bit value.

4. The method of claim 2, further comprising preventing the overall sticky bit value from being included in the mantissa of the summation set of bits during normalization by assigning a bit of the mantissa that would represent the overall sticky bit value to zero whenever the overall sticky bit value is non-zero and is shifted to the mantissa during normalization.

5. The method of claim 1, wherein shifting the mantissa bits of the operand zero or more bit positions comprises shifting the mantissa bits based on a difference between an exponent of the operand and an exponent of the given operand.

6. The method of claim 1, wherein identifying a given operand to which each other operand will be aligned comprises identifying the operand having a largest exponent value.

7. The method of claim 1, wherein the multi-input adder is a four-input adder that has four floating-point inputs and that determines a sum of the four floating-point values received at the four floating-point inputs.

8. A multi-input hardware adder, comprising:

three or more inputs configured to receive three or more floating-point operands; and adder circuitry configured to perform operations comprising:

receiving, for each of three or more operands to be added by the multi-input hardware adder, a set of bits that include a floating-point representation of the operand;

identifying a given operand to which each other operand will be aligned;

for each other operand, generating a shifted set of bits for the operand by shifting mantissa bits of the operand zero or more bit positions such that the bits of the operand align with the bits of the given operand;

determining, based on the shifting, a value of a sticky bit for each other operand, wherein the sticky bit for an operand:

has a non-zero value when a non-zero value was shifted from the set of bits representing the operand to generate the shifted set of bits for the operand; and has a sign that matches a sign of the operand;

determining, based on the value of each sticky bit, an overall sticky bit value, wherein:

the overall sticky bit value is zero whenever (i) all of the sticky bits for all of the other operands are zero or (ii) at least two of the other operands have sticky bits that are non-zero and do not match; and the overall sticky bit value matches the value of each non-zero sticky bit whenever all of the non-zero sticky bits match or there is only one non-zero sticky bit; and determining a sum of the three or more operands using (i) the set of bits that represent the given operand, (ii) the shifted set of bits for each other operand, and (iii) the overall sticky bit value.

9. The multi-input hardware adder of claim 8, wherein determining the sum of the three or more operands comprises:

determining a summation set of bits that represents a sum of the set of bits that represent the given operand and each shifted set of bits;

whenever a hidden bit of a mantissa of the summation set of bits is zero, normalizing the mantissa of the summation set of bits by shifting the mantissa of the summation set of bits until the hidden bit is a one; and determining, based on the mantissa of the summation set of bits and the overall sticky bit value, whether to round a floating-point value represented by the summation set of bits.

10. The multi-input hardware adder of claim 9, wherein determining whether to round the floating-point value represented by the summation set of bits comprises:

determining a number of bit positions the mantissa of the summation set of bits were shifted to normalize the mantissa of the summation set of bits; and whenever the number of bit positions exceeds a number of precision bits of the multi-input adder other than the sticky bit, determining to round the floating-point value represented by the summation set of bits based on the floating-point value represented by the summation set of bits and the overall sticky bit value.

11. The multi-input hardware adder of claim 9, wherein the operations comprise preventing the overall sticky bit value from being included in the mantissa of the summation set of bits during normalization by assigning a bit of the mantissa that would represent the overall sticky bit value to zero whenever the overall sticky bit value is non-zero and is shifted to the mantissa during normalization.

12. The multi-input hardware adder of claim 8, wherein shifting the mantissa bits of the operand zero or more bit positions comprises shifting the mantissa bits based on a difference between an exponent of the operand and an exponent of the given operand.

13. The multi-input hardware adder of claim 8, wherein identifying a given operand to which each other operand will be aligned comprises identifying the operand having a largest exponent value.

14. The multi-input hardware adder of claim 8, wherein the multi-input adder is a four-input adder that has four floating-point inputs and that determines a sum of the four floating-point values received at the four floating-point inputs.

15. A multi-input hardware adder comprising:

three or more inputs configured to receive three or more floating point operands, each input being configured to receive a set of bits that include a floating-point representation of an operand;

an exponent subtraction and swap component configured to identify a given operand to which each other operand will be aligned;

one or more shifters configured to:

generate, for each other operand different from the given operand, a shifted set of bits for the operand by shifting mantissa bits of the operand zero or more bit positions such that the bits of the operand align with the bits of the given operand; and determine, based on the shifting, a value of a sticky bit for each other operand, wherein the sticky bit for an operand:

has a non-zero value when a non-zero value was shifted from the set of bits representing the operand to generate the shifted set of bits for the operand; and has a sign that matches a sign of the operand;

a sticky bit calculator configured to determine, based on the value of each sticky bit, an overall sticky bit value, wherein:

the overall sticky bit value is zero whenever (i) all of the sticky bits for all of the other operands are zero or (ii) at least two of the other operands have sticky bits that are non-zero and do not match; and the overall sticky bit value matches the value of each non-zero sticky bit whenever all of the non-zero sticky bits match or there is only one non-zero sticky bit; and adder circuitry configured to determine a sum of the three or more operands using (i) the set of bits that represent the given operand, (ii) the shifted set of bits for each other operand, and (iii) the overall sticky bit value.

16. The multi-input hardware adder of claim 15, wherein the one or more shifters set the sticky bit for an operand to a value of one whenever a non-zero value is shifted into the sticky bit.

17. The multi-input hardware adder of claim 15, wherein the adder circuitry is further configured to:

determine a summation set of bits that represents a sum of the set of bits that represent the given operand and each shifted set of bits;

whenever a hidden bit of a mantissa of the summation set of bits is zero, normalizing the mantissa of the summation set of bits by shifting the mantissa of the summation set of bits until the hidden bit is a one; and determine, based on the mantissa of the summation set of bits and the overall sticky bit value, whether to round a floating-point value represented by the summation set of bits.

18. The multi-input hardware adder of claim 17, wherein determining whether to round the floating-point value represented by the summation set of bits comprises:

determining a number of bit positions the mantissa of the summation set of bits were shifted to normalize the mantissa of the summation set of bits; and whenever the number of bit positions exceeds a number of precision bits of the multi-input adder other than the sticky bit, determining to round the floating-point value represented by the summation set of bits based on the floating-point value represented by the summation set of bits and the overall sticky bit value.

19. The multi-input hardware adder of claim 15, wherein the operations comprise preventing the overall sticky bit value from being included in the mantissa of the summation set of bits during normalization by assigning a bit of the mantissa that would represent the overall sticky bit value to zero whenever the overall sticky bit value is non-zero and is shifted to the mantissa during normalization.

20. The multi-input hardware adder of claim 15, wherein shifting the mantissa bits of the operand zero or more bit positions comprises shifting the mantissa bits based on a difference between an exponent of the operand and an exponent of the given operand.

* * * * *